US00RE45714E

(19) United States
(12) Reissued Patent
Pech

(10) Patent Number: US RE45,714 E
(45) Date of Reissued Patent: Oct. 6, 2015

(54) HAND IMPLANT

(71) Applicant: Uwe Pech, Tuttlingen (DE)

(72) Inventor: Uwe Pech, Tuttlingen (DE)

(73) Assignee: NORMED Medizin-Technik GmbH, Tuttlingen (DE)

(21) Appl. No.: 29/497,436

(22) Filed: Jul. 24, 2014

Related U.S. Patent Documents

Reissue of:

(64) Patent No.: Des. 664,253
Issued: Jul. 24, 2012
Appl. No.: 29/398,646
Filed: Aug. 3, 2011

(30) Foreign Application Priority Data

Feb. 3, 2011 (EM) ..... 001815952-0003

(51) LOC (10) Cl. ..... 24-02

(52) U.S. Cl.
USPC ..... D24/155

(58) Field of Classification Search
USPC ..... D24/155, 156, 133, 152, 154, 135, D24/144–146, 151; 606/194, 198, 281, 291; 623/23.54, 23.7, 1.15, 903; 604/1.02, 604/103.02
See application file for complete search history.

(56) References Cited

U.S. PATENT DOCUMENTS

| | | | | |
|---|---|---|---|---|
| 7,128,744 | B2 * | 10/2006 | Weaver et al. | 606/280 |
| 7,195,633 | B2 * | 3/2007 | Medoff et al. | 606/309 |
| D576,731 | S * | 9/2008 | Strnad et al. | D24/155 |
| D589,148 | S * | 3/2009 | Strnad et al. | D24/155 |
| D589,149 | S * | 3/2009 | Strnad et al. | D24/155 |
| D594,123 | S * | 6/2009 | Haidukewych et al. | D24/155 |
| D598,149 | S * | 8/2009 | Leslie et al. | D26/37 |
| D646,785 | S * | 10/2011 | Milford | D24/155 |
| 2005/0085818 | A1 * | 4/2005 | Huebner | 606/69 |
| 2005/0245931 | A1 * | 11/2005 | Orbay | 606/69 |
| 2007/0088360 | A1 * | 4/2007 | Orbay et al. | 606/69 |

* cited by examiner

*Primary Examiner* — Phillip S Hyder
(74) *Attorney, Agent, or Firm* — Bachman & LaPointe, PC

(57) CLAIM

The design for a hand implant, as shown.

DESCRIPTION

FIG. 1 is a perspective view of the hand implant according to the invention;
FIG. 2 is a side view of the hand implant of FIG. 1;
FIG. 3 is a top view of the hand implant of FIG. 1;
FIG. 4 is a reverse side view of the hand implant of FIG. 1;
FIG. 5 is an *enlarged rear* end view of the hand implant of FIG. 1;
FIG. 6 is a bottom view of the hand implant of FIG. 1; and,
FIG. 7 is [a] *an enlarged* front end view of the hand implant of FIG. 1.

1 Claim, 7 Drawing Sheets

Figure 1:
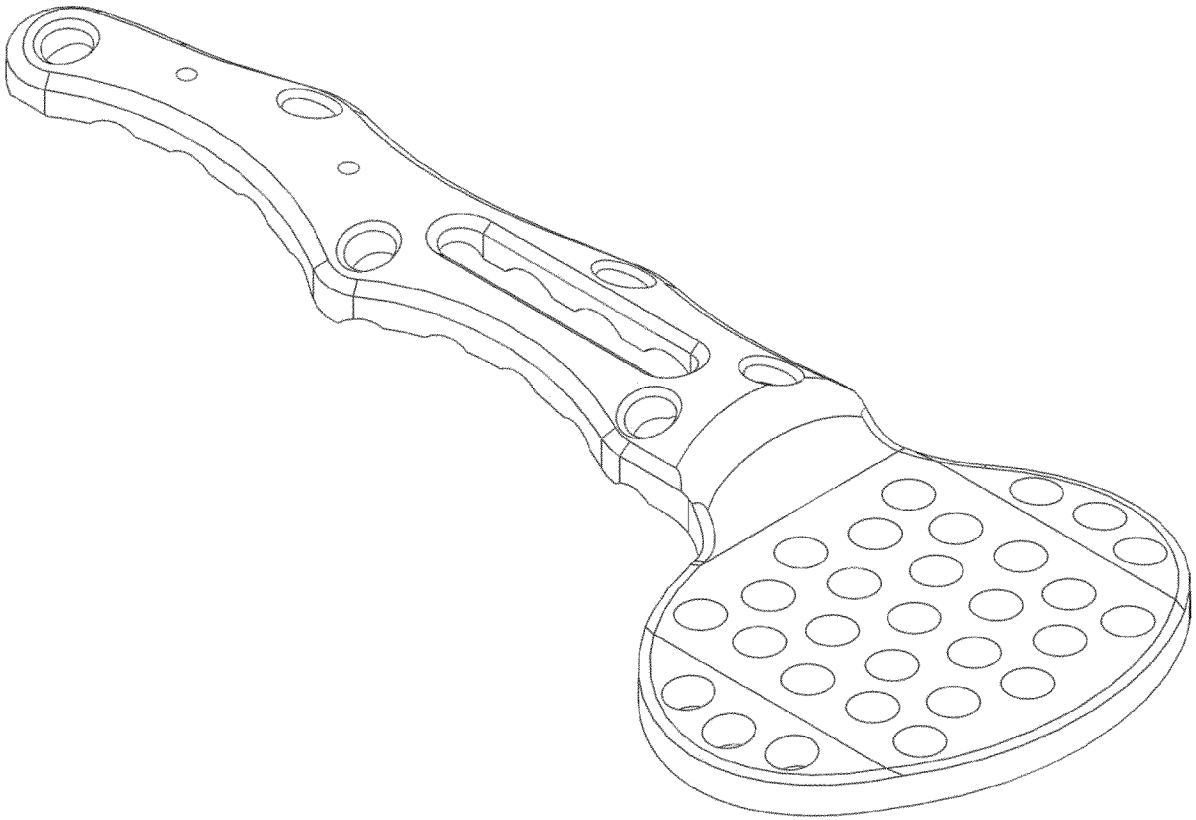
Figure 2:
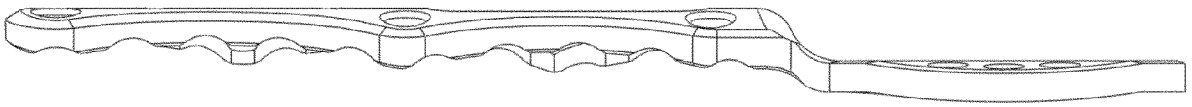
Figure 3:
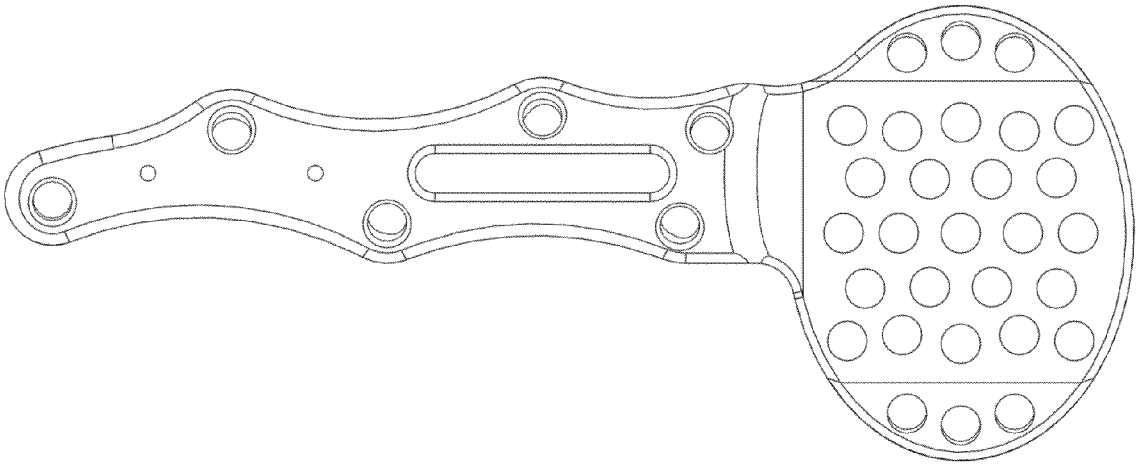
Figure 4:
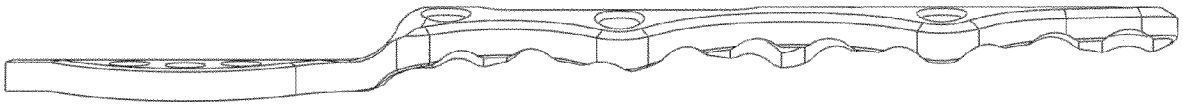
Figure 5:
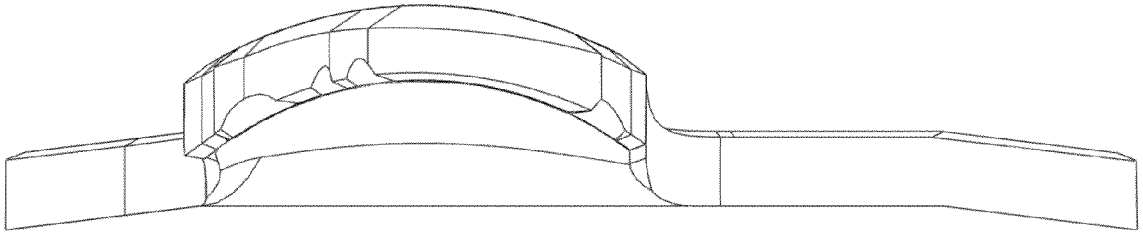
Figure 6:
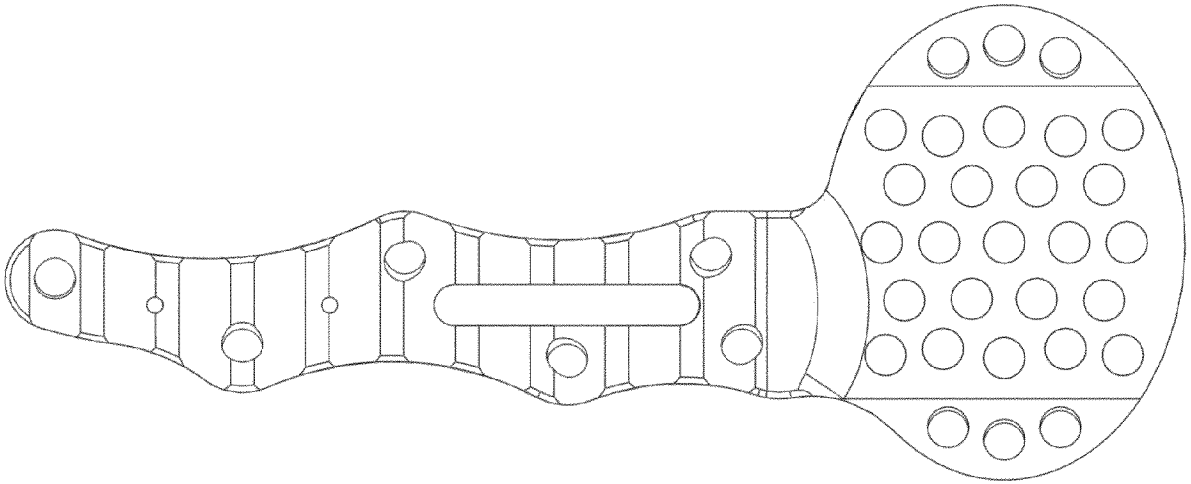
Figure 7:
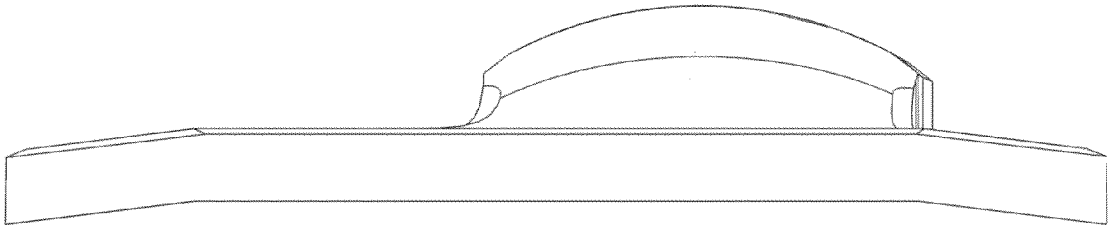

Matter enclosed in heavy brackets [ ] appears in the original patent but forms no part of this reissue; matter printed in italics indicates the additions made by reissue.